Oct. 13, 1942.  J. H. HERZOG  2,298,763
WINDOW WIPER
Filed July 19, 1941   2 Sheets-Sheet 1
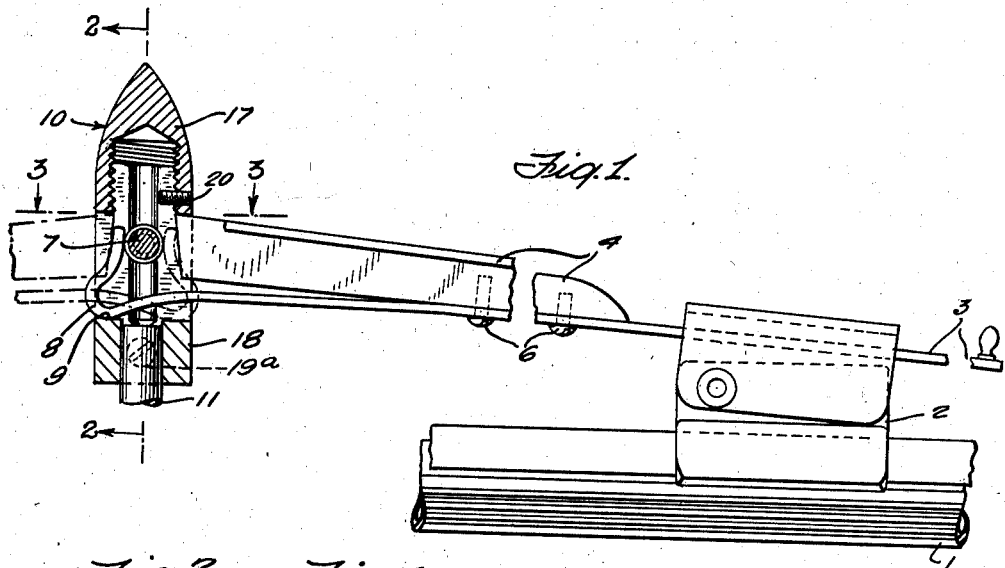
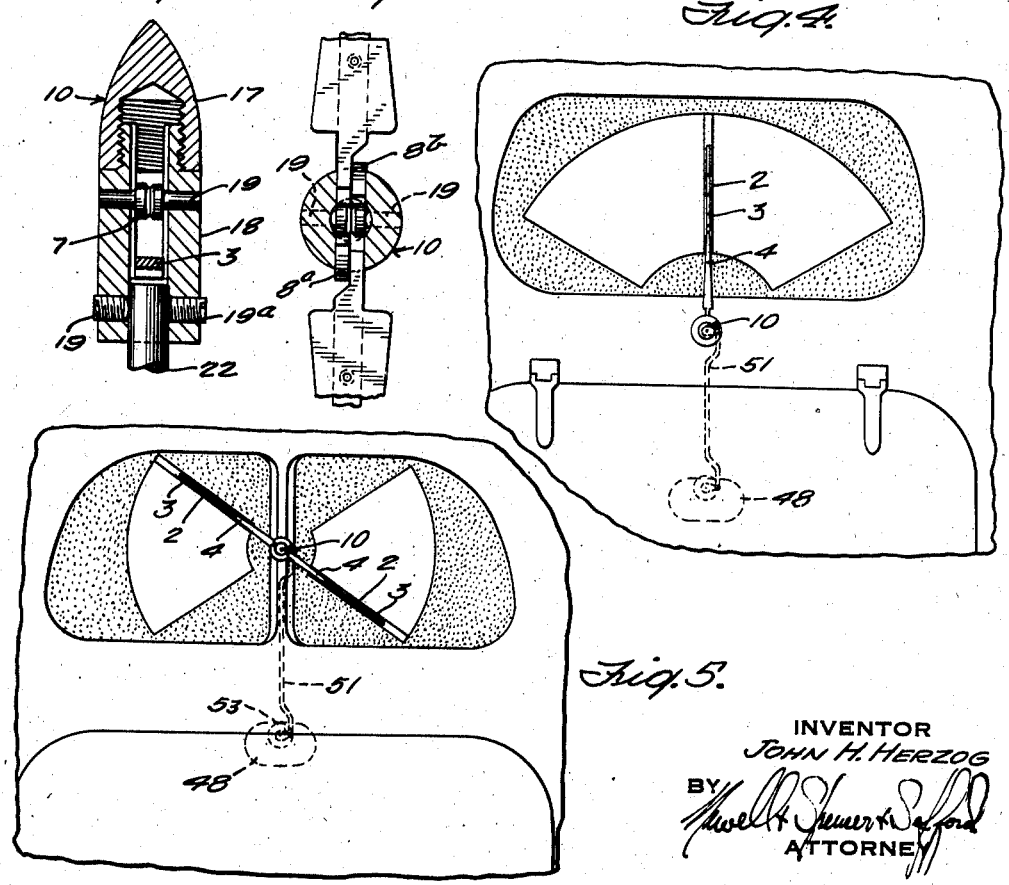
INVENTOR
JOHN H. HERZOG
BY
ATTORNEY Oct. 13, 1942.　　　　J. H. HERZOG　　　　2,298,763
WINDOW WIPER
Filed July 19, 1941　　　　2 Sheets-Sheet 2
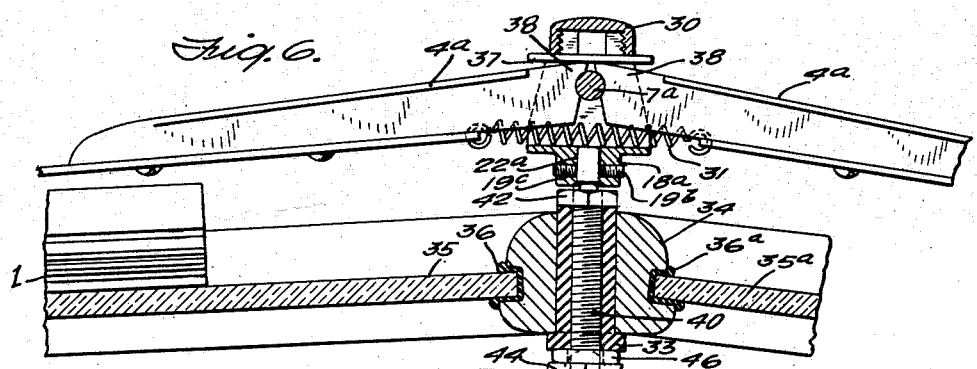
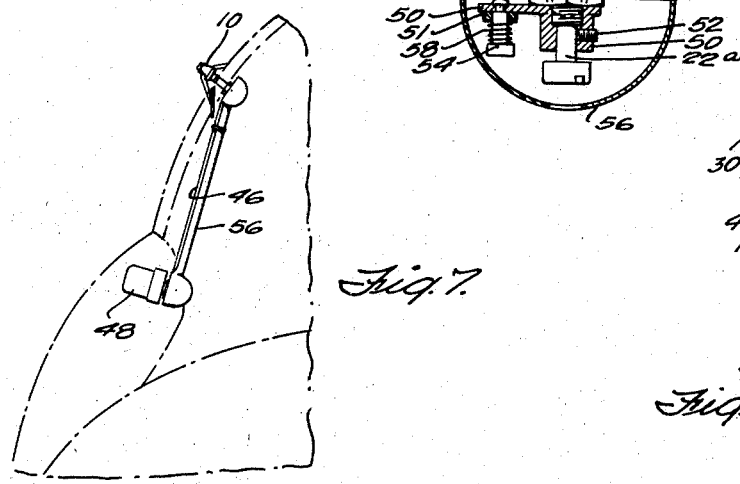
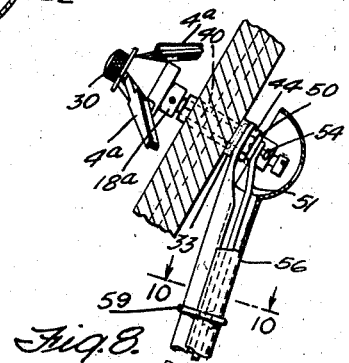
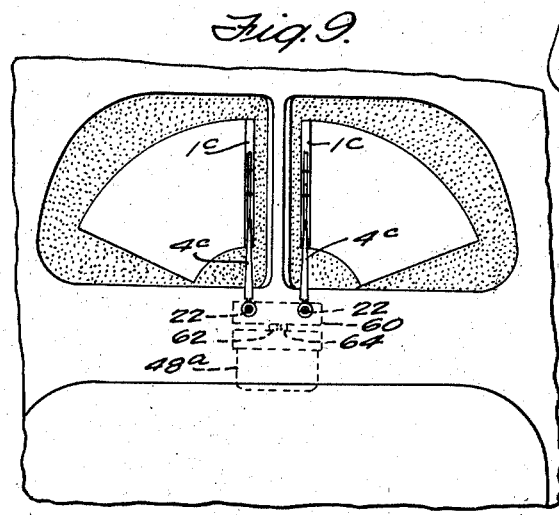
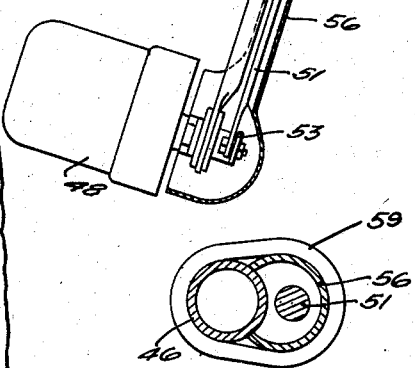
INVENTOR
JOHN H. HERZOG
BY
ATTORNEY Patented Oct. 13, 1942

2,298,763

UNITED STATES PATENT OFFICE 2,298,763

WINDOW WIPER

John H. Herzog, Brooklyn, N. Y.

Application July 19, 1941, Serial No. 403,121

3 Claims. (Cl. 15—255)

This invention relates to windshield wipers for rear automobile windows and more particularly to the method of mounting these wipers and still more particularly to the method of mounting the motor means for said wiper.

It is an object of my present invention to arrange a windshield wiper for either single or dual rear windows which enables the operator of the motor vehicle to clear the window of water, ice or snow and maintain full visibility without leaving his front seat.

It is a further object of my invention to mount this rear view windshield wiper in such a manner that no mechanical operating parts will project into the passanger compartment and it is a further object of my invention to mount the motor means which drives this rear view wiper in the compartment used for luggage in order to prevent any noise of the operating mechanism from reaching the inside of the car.

In the past driving in inclement weather has been made doubly difficult and sometimes even dangerous, particularly in the modern streamlined cars in which the back window is sloping at an angle which increases the deposit of rain, snow or ice on this window. In the past, when one has wished to clear the rear window, it has been necessary to get out and clean this window by hand and even this has been but a temporary expedient, the vision often being quickly obscured by falling rain or snow or water splashed up by passing vehicles. Another object of my invention, therefore, is to provide a device for automatically keeping the rear window cleared so that the driver may at all times have a knowledge of the rear traffic conditions as is essential in making turns, stops, etc.

Referring first to the drawings:

Fig. 1 is a view partly in section and partly in elevation of the mounting for the wiper arm which may be used according to my invention;

Fig. 2 is a view in elevation of the mounting part which is shown in Fig. 1 in section along line 2—2;

Fig. 3 is a view of the mounting part showing the method of mounting two opposed wiper arms, taken along line 3—3 of Fig. 1;

Fig. 4 is an elevation of the rear window of an automobile, illustrating how to mount a wiper in accordance with any invention;

Fig. 5 is an elevation of an automobile having a two part rear window, showing the method of applying my invention to such a window;

Fig. 6 is a section through a two part automobile window on which an alternative form of my wiper has been mounted;

Fig. 7 is a schematic side elevation of the rear of an automobile showing a wiper as shown in Fig. 6 mounted in place;

Fig. 8 is an enlarged elevation of the drive assembly shown in Fig. 7;

Fig. 9 is a rear view of an automobile showing the mounting of another alternative construction; and Fig. 10 is a section along line 10—10 of Fig. 8.

Referring first to Fig. 1, the wiper blade 1, is held by the spring clip 2 to the steel spring arm 3. This spring arm 3 is rigidly attached by the screws 6 to the rigid arm 4 which consists of a metal channel in the example shown. This channel piece is held fulcrumed against the pin 7 and urged toward the rear view window by the interaction of the cap 17 which is screwed down against the member 4 and the part 8 of the spring 3 which is bent to engage both the ledge 9 at the bottom of the slot and the pin 7. The entire unit 10 is oscillated by the shaft 11, which is shown more clearly in Figs. 6 and 8.

Fig. 2 shows a view of the wiper arm mounting taken at right angles to Fig. 1 to clearly bring out the pin construction. As shown there, the pin 7 runs fully across the slot and is held in place by a rivet 19 running through the shell 18 and the pin 7. The top of the shell 18 is reduced in size and threaded, and the female threads in the cap 17 engage the shell and the cap 17 is held from turning by the set screw 20 which goes through the cap and into the slot of the shell. The shell is fastened to the drive shaft 22 by the set screws 19 and 19a which are put through that part of the shell 18 into which the shaft fits.

It is possible to mount either a single wiper arm, as would be done for a single window, or a double wiper arm from the same mounting, the method of mounting the double arms being clearly shown in Fig. 3. Instead of allowing the portion 8 of the spring member 3 to extend the whole width of the slot, the width of the sections 8a and 8b are each reduced by half, so that each is independently sprung without interferring with the other.

The method of mounting the motor drive for these wipers on various cars is shown in Figs. 4 and 5. In Fig. 4 is shown a single pane rear window, and the wiper shaft is shown to project through the body of the car below the rear window. The driving motor is placed in the luggage compartment and is supported entirely by the support member which is held in place by the mounting which passes through the frame of the rear window, no further motor mounting being required in the trunk. Thus, no drilling or fitting together of parts is required and the wiper may be installed without difficulty in any type of car. In Fig. 5 is shown a similar mounting but applied to a split rear window with the shaft through the mullion between the panes of glass. In this case a wiper arm mounting such as is shown in Fig. 3 is used.

Referring next to Figs. 6 and 8, I have shown a modification of my invention in which a small spiral spring 31 is used to tension the double blades against the window. The blades are attached to the arms 4a, which arms are pivoted about the bearing member 7a. In order to prevent the possibility of the pressure of the arms collapsing the blades against the window the cap 30 is provided with a shoulder 37 which engages the corner 38 of the arms 4a, which stops the arms from moving beyond a predetermined point relative to the window. The arms are prevented from swinging outward to such a degree that the spring 31 will be beyond dead center by the same shoulder 37, which then engages the top of the arms 4a. In this figure the window panes 35 and 35a are shown set into the mullion 34 with the rubber seals 36 and 36a around the glass.

The shaft 22a is mounted in the tubular metal bushing 40; and this bushing is externally threaded and fitted with clamping nuts 42 and 44 and with the rubber bushing 33 which prevents squeaks and rattles due to metal contact, and makes an air-tight, moisture-proof, vibration absorbing seal. This rubber bushing 33 is compressed by the nuts 42 and 44, and until it substantially fills any space which existed around the bushing.

As shown, a frame member 46, which supports the drive motor 48, is mounted on the tubular bushing 40 under the clamping nut 44 and against the rubber bushing 33. Thus frame 46 extends through the window sill into the luggage compartment (including, of course, a rumble seat in coupes so equipped).

The shaft 22a at its inner end is connected to a crank arm 50 by a set screw 52 and is connected to a link or connecting rod 51 by which it is connected to a crank 53 on the motor 48. The arm 50 is set approximately perpendicular to the link 51 so that a movement of the oscillating link 51 when driven by the motor 48 will cause oscillating movement of the shaft 22a and wiper arms 4a. The oscillating rod 51 fits loosely over a pin 54 on the arm 50 and is held against vibration by the spring 58, which urges the rod 51 and arm 50 into close contact.

Fig. 7 shows diagrammatically the rear part of an automobile and the location of the wiper mechanism. The motor 48 is, as shown, in the luggage compartment rigidly supported on the frame arm 46, which in turn is supported on the mullion 34 by the structure described above.

As shown more clearly in the enlarged view, Fig. 8, the arm 46 serves as a rigid frame member and to this a housing member 56 is secured, e. g., by a rubber band or bands 59 as clearly shown in Figs. 8 and 10. The connecting rod 51 oscillates within the housing 56 and is protected thereby against rubbing on anything which may be packed in the luggage compartment or on the window sill.

The motor 48 and its drive connections may be similar to those heretofore used for electric windshield wipers, but it is an advantage of my invention that by merely connecting the rod 51 at a greater or less radius on the arm 53 or by changing the drive cam, if a cam drive oscillating mechanism is used, the throw of the wiper arm may be changed to fit any size window and to accommodate the device to single arm or double arm use on single or double pane windows. Thus a standard construction can with very little modification of only a very few parts be readily adapted for use on any car.

In some cases it may be preferred to use separate wiper arms for the respective panes of a double pane window. In such case a similar mounting and drive mechanism may be used, but with twin connecting rods 51 on the crank arm 53 connecting respectively to crank arms 50 on the separate wiper mechanisms or, as shown in Fig. 9, the oscillating motor mechanism 48a may be directly connected to the two wiper shafts 22 for the wiper arm 4c.

In the example shown in Fig. 9, the motor 48a is mounted directly below an oscillating drive mechanism 60 of conventional design, and separate shafts 62 and 64 are brought through the body of the automobile to drive the arms 4c to which the wiper blades 1c are attached. The motor 48a and gear box 60 are hung directly from the bushings through which the shafts 62 and 64 pass as in the other forms of my invention.

The method of installing a unit such as shown in Figs. 1–8, is simple. First, a hole of proper size is drilled through the mullion of the car window and the metal bushing 40 slipped through and fitted with a rubber washer 33. A second hole is drilled through the window sill into the luggage compartment, and the frame 46 on which the motor is hung is passed up through this hole toward the window. The upper end of the frame member 46 is slipped over the bushing 40 and the nut 44 is turned down to clamp these parts all firmly in position. The arm 50 is then fitted onto the end of the shaft 22a and the set screw 52 tightened against the shaft. Finally the housing 56 is slipped into place and the installation is complete.

What I claim is:

1. A wiper for a two part rear window of a motor vehicle having a passenger compartment provided with a rear window and a luggage compartment below said window, the two parts of the rear window being separated by a frame, which wiper comprises two wiper arms mounted through a hole in said frame, a drive for said wiper arms comprising an oscillating motor mounted in the luggage compartment of said motor vehicle, an elongated support member on which said motor is mounted, hollow clamping means extending through the hole in the window frame clamping said support member to the window frame, and reciprocating drive means connecting said motor with the wiper.

2. A wiper for a rear window of a motor vehicle, said rear window being surrounded by a frame, which comprises a wiper arm, a mounting for said arm through a hole in the window frame, a motor to drive said wiper arm supported from said mounting by an elongated support member, and a drive member adjacent said support member, and adapted to transmit a reciprocating drive motion from the motor to the wiper arm.

3. A wiper for a rear automobile window which is surrounded by a frame which comprises at least one wiper arm, a drive shaft for said wiper arm extending through the frame of the window to be wiped, a mounting bushing through which said drive shaft passes, means for holding said drive shaft against longitudinal movement in said bushing, means for tensioning said wiper blade against the window, and means for reciprocally driving said wiper arm, said driving means being mounted on a rigid support member supported by and extending from said mounting bushing, and connecting means between the motor and a crank on the wiper drive shaft.

JOHN H. HERZOG.